US011793313B2

(12) United States Patent
Wei

(10) Patent No.: US 11,793,313 B2
(45) Date of Patent: Oct. 24, 2023

(54) WASTE STORAGE DEVICE AND INTELLIGENT MANAGEMENT SYSTEM

(71) Applicant: Hong-Fan Wei, Taipei (TW)

(72) Inventor: Hong-Fan Wei, Taipei (TW)

( * ) Notice: Subject to any disclaimer, the term of this patent is extended or adjusted under 35 U.S.C. 154(b) by 389 days.

(21) Appl. No.: 17/101,654

(22) Filed: Nov. 23, 2020

(65) Prior Publication Data

US 2021/0155405 A1 May 27, 2021

Related U.S. Application Data

(60) Provisional application No. 62/939,716, filed on Nov. 25, 2019.

(30) Foreign Application Priority Data

Jun. 12, 2020 (CN) .......................... 202010535343.3

(51) Int. Cl.
*B29C 65/00* (2006.01)
*A47C 7/46* (2006.01)
(Continued)

(52) U.S. Cl.
CPC ............ *A47C 7/46* (2013.01); *A47L 15/0028* (2013.01); *A47L 15/16* (2013.01); *A47L 15/4285* (2013.01); *A47L 15/4295* (2013.01); *A47L 15/46* (2013.01); *B65F 1/068* (2013.01); *B65F 1/1473* (2013.01); *A47C 7/282* (2013.01);
(Continued)

(58) Field of Classification Search
CPC .. A47L 15/0028; A47L 15/16; A47L 15/4285; A47L 15/4295; A47L 15/46; B65F 1/068; B65F 1/1473; B65F 2210/128; B65F 2210/129; B65F 2210/137;
(Continued)

(56) References Cited

U.S. PATENT DOCUMENTS

2016/0236863 A1* 8/2016 Wall ......................... B65F 1/06
2019/0381747 A1* 12/2019 Qiu ..................... B29C 66/4312

FOREIGN PATENT DOCUMENTS

| CN | 105314300 A | | 2/2016 | |
| CN | 106395198 | * | 2/2017 | ................ B65F 1/14 |

(Continued)

OTHER PUBLICATIONS

China Patent Office, Office Action dated Apr. 29, 2022 for CN application No. 202010535343.3.

*Primary Examiner* — John K Fristoe, Jr.
*Assistant Examiner* — Elizabeth J Volz
(74) *Attorney, Agent, or Firm* — Li & Cai Intellectual Property (USA) Office

(57) ABSTRACT

A waste storage device and an intelligent management system are provided. The waste storage device includes: a casing, a control module disposed in the casing, a microphone module disposed on an outer surface of the casing, and a moving module electrically connected to the control module. The microphone module is electrically connected to the control module. When the microphone module receives a first audio signal, the microphone module transmits the first audio signal to the control module, the control module analyzes an audio sending direction of the first audio signal, and the control module provides a driving signal to the moving module according to the first audio signal to drive the waste storage device to move in the audio sending direction.

17 Claims, 8 Drawing Sheets

(51) Int. Cl.
    *B65F 1/06*     (2006.01)
    *B65F 1/14*     (2006.01)
    *A47L 15/00*    (2006.01)
    *A47L 15/16*    (2006.01)
    *A47L 15/42*    (2006.01)
    *A47L 15/46*    (2006.01)
    *A47C 7/28*     (2006.01)

(52) U.S. Cl.
    CPC ... *B65F 2210/128* (2013.01); *B65F 2210/129* (2013.01); *B65F 2210/137* (2013.01); *B65F 2210/167* (2013.01); *B65F 2210/168* (2013.01); *B65F 2210/184* (2013.01)

(58) Field of Classification Search
    CPC .......... B65F 2210/167; B65F 2210/168; B65F 2210/184
    USPC .... 220/495, 495.01, 495.06, 495.07, 495.08, 220/495.1, 495.11, 908, 908.1
    See application file for complete search history.

(56) References Cited

FOREIGN PATENT DOCUMENTS

| | | | | |
|---|---|---|---|---|
| CN | 106395198 | A | 2/2017 | |
| CN | 108502417 | A | 9/2018 | |
| CN | 207810375 | U | 9/2018 | |
| CN | 108750482 | * | 11/2018 | ................ B65F 1/14 |
| CN | 108750482 | A | 11/2018 | |
| CN | 108910355 | A | 11/2018 | |
| CN | 109178719 | A | 1/2019 | |
| CN | 109665242 | * | 4/2019 | ................ B65F 1/14 |
| CN | 109665242 | A | 4/2019 | |
| CN | 109748012 | * | 5/2019 | ................ B65F 1/14 |
| CN | 109748012 | A | 5/2019 | |
| JP | 2006102861 | A | 4/2006 | |

* cited by examiner

WASTE STORAGE DEVICE AND INTELLIGENT MANAGEMENT SYSTEM

CROSS-REFERENCE TO RELATED PATENT APPLICATION

This application claims priority to the U.S. Provisional Patent Application Ser. No. 62/939,716 filed on Nov. 25, 2019, and China Patent Application No. 202010535343.3, filed on Jun. 12, 2020 in People's Republic of China. The entire content of each of the above identified applications is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a waste storage device and an intelligent management system, and more particularly to a waste storage device and an intelligent management system providing improved user experiences.

BACKGROUND OF THE DISCLOSURE

Conventional waste storage devices are usually disposed at fixed locations, and most of which can only be operated manually. The conventional waste storage devices can be highly inconvenient for a user, and the user experience is often unsatisfying. Therefore, it has become an important issue in the industry to provide a waste storage device that is mobile and that provides improved user experiences.

SUMMARY OF THE DISCLOSURE

In response to the above-referenced technical inadequacies, the present disclosure provides a waste storage device and an intelligent management system.

In one aspect, the present disclosure provides a waste storage device including a casing, a control module disposed in the casing, a microphone module disposed on an outer surface of the casing, and a moving module electrically connected to the control module. The microphone module is electrically connected to the control module. When the microphone module receives a first audio signal, the microphone module transmits the first audio signal to the control module, the control module analyzes an audio sending direction of the first audio signal, and the control module provides a driving signal to the moving module according to the first audio signal, so as to drive the waste storage device to move in the audio sending direction.

In another aspect, the present disclosure provides an intelligent management system disposed at a predetermined area. The intelligent management system including a server and a waste storage device communicatively connected to the server. The waste storage device includes a casing, a control module disposed in the casing, a microphone module disposed on an outer surface of the casing, a communication module electrically connected to the control module, and a moving module electrically connected to the control module. The microphone module is electrically connected to the control module, the communication module of the waste storage device is communicatively connected to the server, and the server provides a map data to the waste storage device. When the microphone module receives a first audio signal, the microphone module transmits the first audio signal to the control module, the control module analyzes an audio sending direction of the first audio signal, and the control module provides a driving signal to the moving module according to the first audio signal and the map data to the moving module, so as to drive the waste storage device to move in the audio sending direction.

One of the beneficial effects of the waste storage device and the intelligent management system of the present disclosure is that the waste storage device and the intelligent management system can move to a target position according to the first audio signal, making it more convenient to use and effectively improving the user experience.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
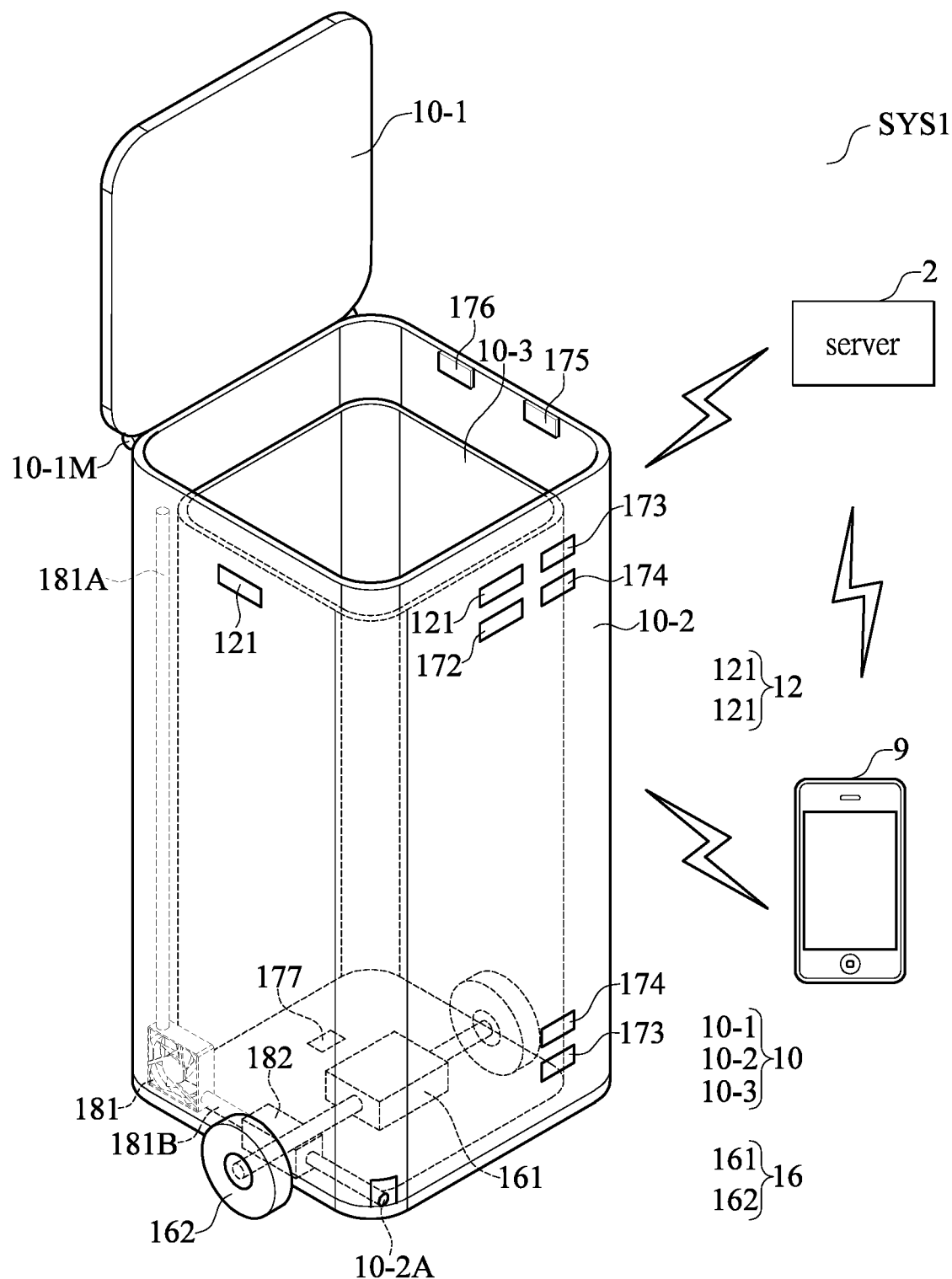
FIG. 1 is a schematic view of an intelligent management system in one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Embodiment

Figure 2:
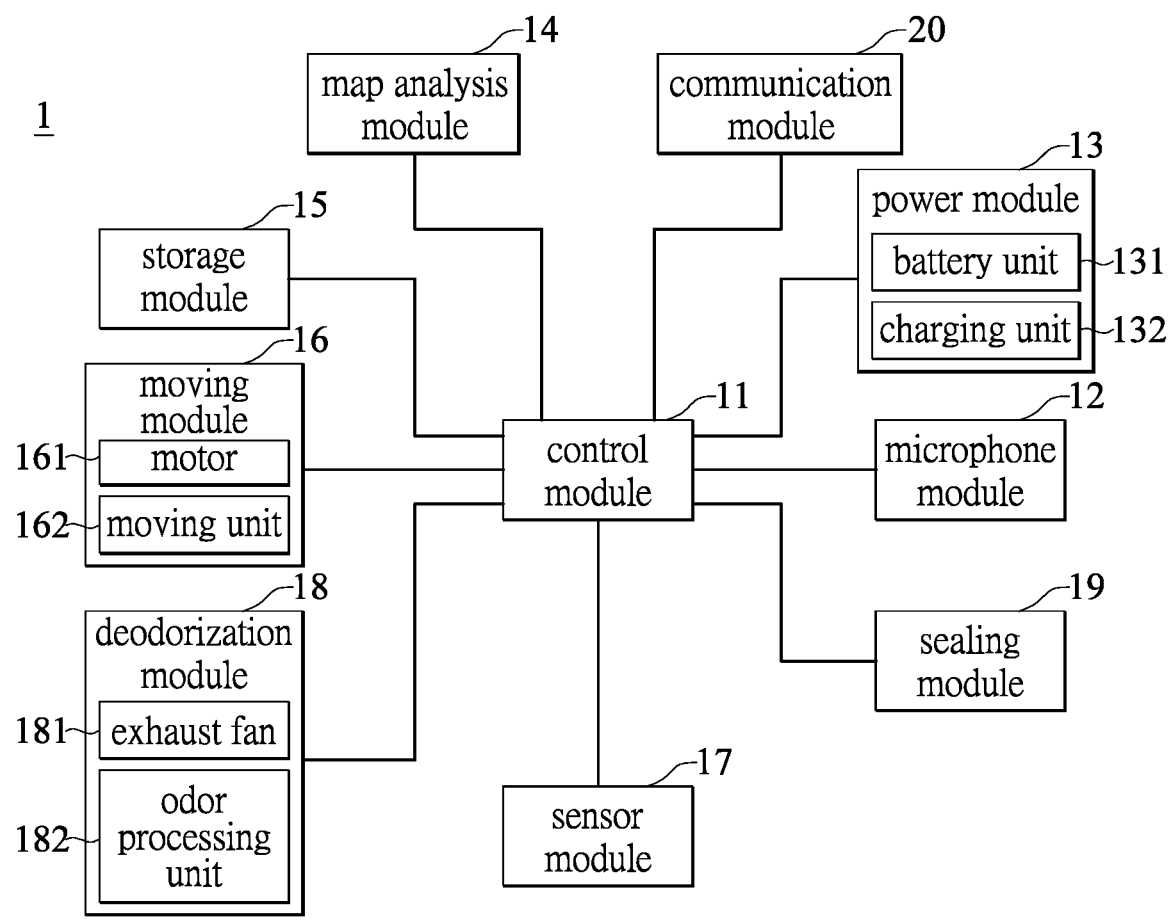
FIG. 2 is a functional block diagram of a waste storage device in one embodiment of the present disclosure.
Figure 3:
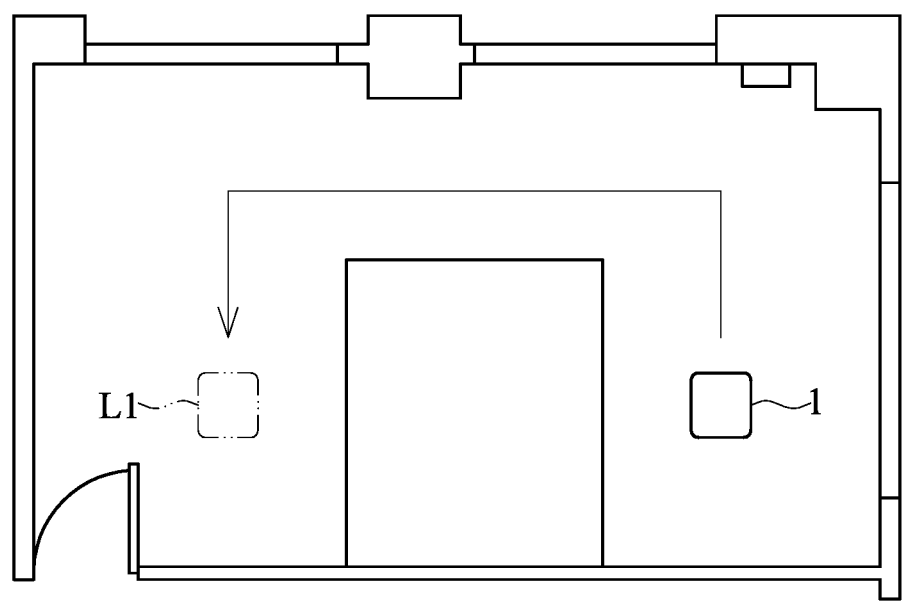
FIG. 3 is a schematic view showing the waste storage device moving in a predetermined area in one embodiment of the present disclosure.

References are made to FIG. 1 to FIG. 3. FIG. 1 is a schematic view of an intelligent management system in one embodiment of the present disclosure. FIG. 2 is a functional block diagram of a waste storage device in one embodiment of the present disclosure. FIG. 3 is a schematic view showing the waste storage device moving in a predetermined area in one embodiment of the present disclosure.

As shown in FIG. 1, in this embodiment, an intelligent management system SYS1 includes a waste storage device 1 and a server 2. The waste storage device 1 and the server 2 are disposed in the predetermined area.

The waste storage device 1 includes a casing 10, a control module 11, a microphone module 12, a power module 13, a map analysis module 14, a storage module 15, a moving module 16, a sensor module 17, a deodorization module 18, a sealing module 19, and a communication module 20.

The control module 11 is electrically connected to the microphone module 12, the power module 13, the map analysis module 14, the storage module 15, the moving module 16, the sensor module 17, the deodorization module 18, the sealing module 19, and the communication module 20.

The control module 11 is disposed in the casing 10. The microphone 12 is disposed on an outer surface of the casing 10. In this embodiment, the microphone module 12 includes a plurality of microphone units (not shown in the figures) that are disposed surrounding the outer surface of the casing 10.

The casing 10 includes a cover 10-1, an outer casing 10-2, and an inner casing 10-3. The inner casing 10-3 is disposed in the outer casing 10-2, and the cover 10-1 is connected to the outer casing 10-2.

The microphone module 12 is disposed on the outer surface of the outer casing 10-2 and is utilized to receive audio signals. The moving module 16 is disposed under the outer casing.

The cover 10-1 can be determined to be opened or closed according to an audio signal or a gesture signal. That is to say, the cover 10-1 and the outer casing 10-2 are driven by a micromotor 10-1M as a rotating shaft therebetween. In addition, an image sensor 172 is disposed on the cover 10-1. When the microphone module 12 of the waste storage device 1 receives an audio signal or the image sensor 172 receives a gesture signal, the control module 11 sends an opening signal to the micromotor 10-1M connected between the cover 10-1 and the outer casing 10-2 to open the cover 10-1.

Moreover, when the microphone module 12 receives a first audio signal, the microphone module 12 sends the first audio signal to the control module 11. The control module 11 then analyzes an audio sending direction of the first audio signal. Afterwards, the control module 11 provides a driving signal to the moving module 16 according to the first audio signal, so as to drive the waste storage device 1 to move in the audio sending direction. In this embodiment, the first audio signal can be a summoning signal, e.g., "Come", and "Come here", and other similar utterances. In this embodiment, the control module 11 further includes a function of simple semantic analysis that analyzes voice signals provided by a user. When the voice signals include a moving request or a request of opening the cover 10-1, the control module 11 then provides a corresponding control signal to the moving module 16 or the micromotor 10-1M on the cover 10-1.

When the waste storage device 1 is disposed in the predetermined area, the waste storage device 1 detects the predetermined area in advance to establish map data corresponding to the predetermined area, and then store the map data in the storage module 15. In this embodiment, the map data corresponding to the predetermined area is an indoor map data including compartments, doors, windows, positions of furniture, etc. in the predetermined area. In addition, the storage module 15 can also store data, such as audio signals and gesture signals. The storage module 15 can be a flash memory, a read-only memory, a programmable read-only memory, an electrically rewritable read-only memory, an erasable programmable read-only memory, or an electrically erasable programmable read-only memory.

When the waste storage device 1 is disposed in the predetermined area (e.g., a living room, a bedroom, or a household space), the waste storage device 1 moves around and detects the surroundings to establish the map data of the predetermined area. During the process of moving around and detecting the surroundings, the waste storage device 1 also establishes data of obstacles, such as that of tables, chairs, carpets, and decorations and furnishings, and such obstacles can cause difficulties when the waste storage device 1 moves around. An infrared sensor 173 or a laser ranging sensor 174 of the sensor module 17 is disposed on a top side and a bottom side of the waste storage device 1, so as to ensure that the waste storage device 1 is not obstructed when moving around.

Therefore, the map analysis module 14 provides a route according to the map data of the predetermined area and the audio sending direction, and the map analysis module 14 sends the route to the control module 11.

The control module 11 provides the driving signal to the moving module 16 according to the moving signal provided by the sensor module 17, the audio sending direction, and the route, so as to move in the audio sending direction.

The control module 11 can be a central processing unit (CPU), an application-specific integrated circuit (ASIC), or a microprocessor (MCU).

The sensor module 17 includes a gyroscope sensor (not shown in the figures), a geomagnetic sensor (not shown in the figures), the image sensor 172, an infrared sensor 173, the laser ranging sensor 174, an optical sensor 175, an olfactory gas sensor 176, and a weight sensor 177.

The gyroscope sensor and the geomagnetic sensor are used to confirm whether or not the casing 10 of the waste storage device 1 is tilted.

The laser ranging sensor 174 or the infrared sensor 173 of the sensor module 17 is disposed on the outer side of the outer casing 10-2. In this embodiment, the sensor module 17 includes two laser ranging sensors 174 and two infrared sensors 173, which can be respectively disposed on the top side and the bottom side of the outer casing 10-2. Although map data (two-dimensional map) and the route provide guidance, since the waste storage device 1 has a certain height, sensors are disposed on the top side and the bottom side of the outer casing 10-2 to avoid the obstacles having different heights that are portrayed in the map data.

The control module 11 can also obtain a target position L1 through analyzing the first audio signal and the map data. When the control module 11 is moving in the audio sending direction and the waste storage device 1 approaches the target position L1, the control module 11 sends a stop signal to the moving module 16, such that the waste storage device 1 is stopped at a position with a predetermined distance from the target position L1. That is to say, when the waste storage device 1 moves, the control module 11 further prevents the waste storage device 1 from colliding with the afore-mentioned obstacles according to distance measuring data of the infrared sensor 173 or the laser ranging sensor 174 of the sensor module 17. In another embodiment, the waste storage device 1 may perform temperature scanning to the predetermined area to obtain a direction, a distance, and a location of a humanoid heat source through an infrared sensor, and then plan a route based on pre-recorded map data of the predetermined area.

The moving module 16 includes a motor 161 and a moving unit 162. The motor 161 is connected to the moving unit 162. The motor 161 receives the driving signal to drive the moving unit 162.

The moving unit 162 includes a plurality of steering gears, a plurality of wheels, or a plurality of crawlers, and the motor 161 is connected to the moving unit 162 such that the waste storage device 1 can move in all directions.

Since the infrared sensor 173 or the laser ranging sensor 174 of the sensor module 17 is used in this embodiment to measure the predetermined area, a size of the predetermined area is first recorded. Afterwards, the obstacles or the furnishings in the predetermined area can be measured. After the size of the predetermined area is recorded, coordinates of the predetermined area can be analyzed and established. The resolution of the coordinates can be determined by a minimum moving distance of the moving module 16. In this way, a map of the predetermined area can be used to determine the movement of the waste storage device 1. In this embodiment, the map analysis module 14 can be implemented by software, firmware, or hardware. In terms of firmware or hardware, the map analysis module 14 can be implemented by an application-specific integrated circuit (ASIC). In terms of software, the map analysis module 14 can be processed through using a software program paired with the server 2 or the control module 11.

Figure 4:
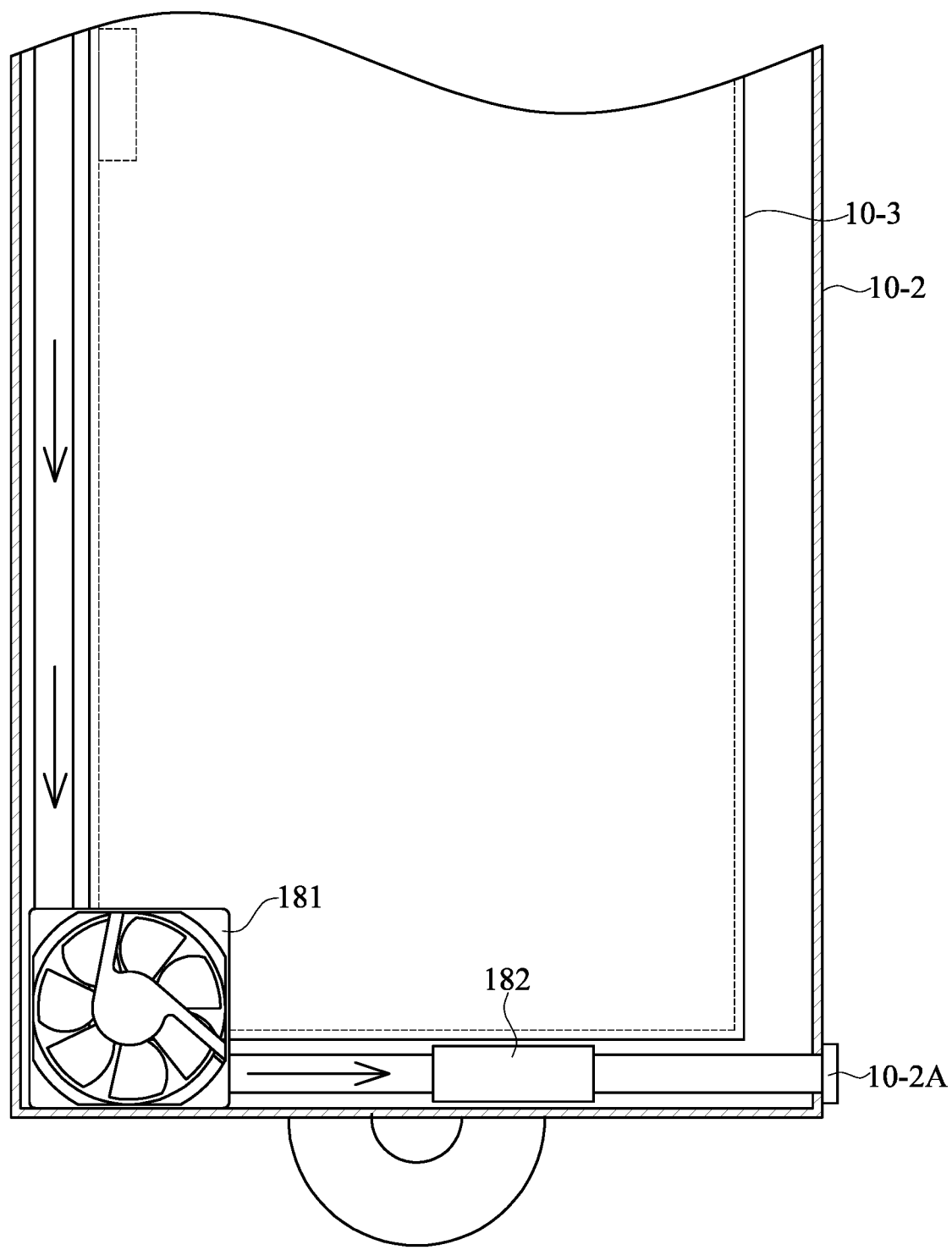
FIG. 4 is a schematic view of a deodorization module of the waste storage device in one embodiment of the present disclosure.
Figure 7:
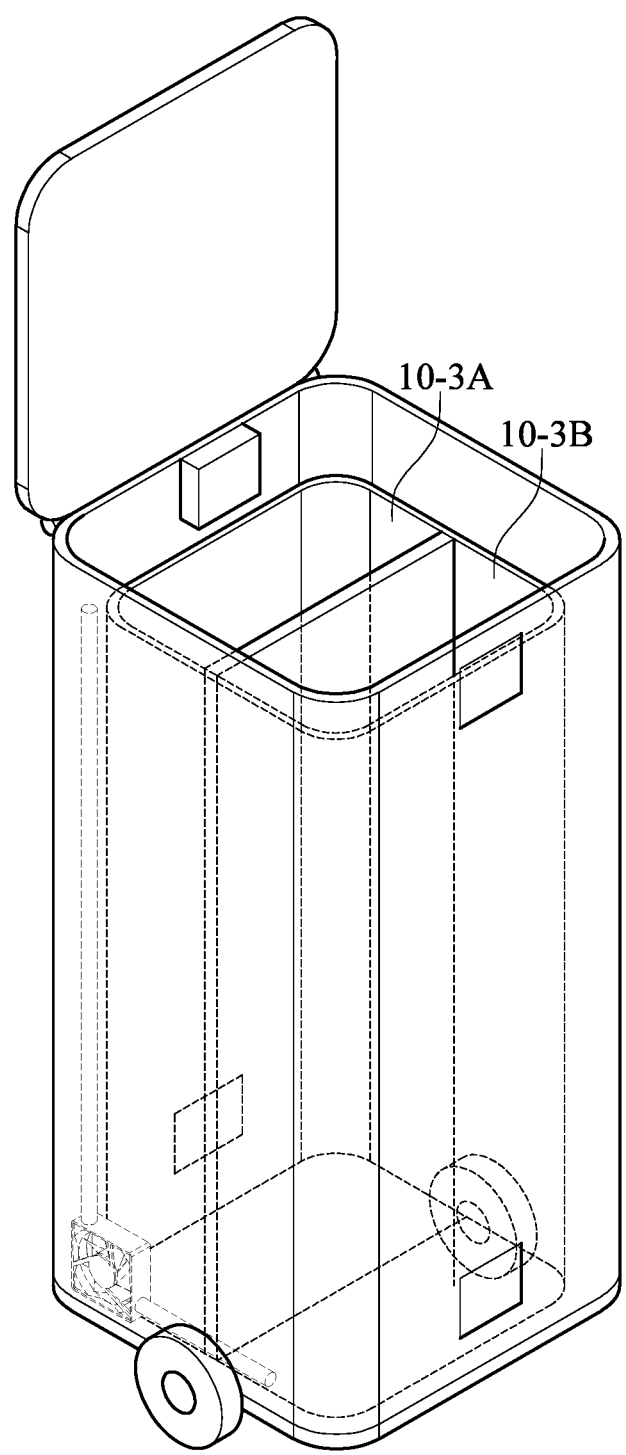
FIG. 7 is a schematic view of an inner casing of the waste storage device including two accommodating spaces in one embodiment of the present disclosure.

Reference is made to FIG. 4, which is a schematic view of a deodorization module of the waste storage device in one embodiment of the present disclosure. The deodorization module 18 of the waste storage device 1 is disposed between the inner casing 10-3 and the outer casing 10-2. In this embodiment, a size of the inner casing 10-3 is smaller than that of the outer casing 10-2. As shown in FIG. 1 and FIG. 7, the inner casing 10-3 can further include a single accommodating space or two or more accommodating spaces, which can be utilized for waste classification.

The inner casing 10-3 can include a first accommodating space 10-3A, or include the first accommodating space 10-3A and a second accommodating space 10-3B, which can be utilized for waste classification.

The deodorization module 18 includes an exhaust fan 181 and an odor processing unit 182. The exhaust fan 181 includes a first opening 181A and a second opening 181B. The first opening 181A of the exhaust fan 181 is connected to the odor processing unit 182. The exhaust fan 181 can extract air adjacent to the top side of the casing 10 and discharge the air out of the waste storage device 1 through the odor processing unit 182 and an exhaust outlet 10-2A of the outer casing 10-2.

When the olfactory gas sensor 176 of the sensor module 17 detects a predetermined gas, the olfactory gas sensor 176 sends an odor determination signal to the control module 11. The control module 11 provides a deodorization driving signal to the deodorization module 18 according to the odor determination signal. The deodorization module 18 (i.e., the exhaust fan 181 thereof) is then turned on to extract gas in the outer casing 10-2 and transfer the gas to the odor processing unit 182 for filtering. Afterwards, the air filtered by the odor processing unit 182 is then discharged to the surrounding environment of the casing 10. After the user disposes of the waste, the olfactory gas sensor 176 of the waste storage device 1 analyzes the odor in the outer casing 10-2. When the olfactory gas sensor 176 determines that the odor is unpleasant, the olfactory gas sensor 176 performs a deodorization process to reduce the unpleasant odor in the casing 10. The olfactory gas sensor 176 is disposed inside the outer casing 10-2. In this embodiment, the odor processing unit 182 may include activated carbon or other odor filtering materials.

The weight sensor 177 of the sensor module 17 is provided on an inner bottom side of the outer casing 10-2. When the inner casing 10-3 is disposed in the outer casing 10-2, the inner casing 10-3 is disposed on one side of the weight sensor 177. The weight sensor 177 is used to detect a weight value of the inner casing 10-3. When the weight value of the inner casing 10-3 is greater than a predetermined weight value, the control module 11 provides a notification signal for notification. Furthermore, the inner casing 10-3 is the main accommodating space for accommodating waste, and a total weight of the inner casing 10-3 includes the weight of the inner casing 10-3 and the weight of the waste disposed therein.

The notification signal can be an optical signal or an audio signal. In this embodiment, the waste storage device 1 can include a light emitting diode (LED) unit that sends optical signals or a speaker unit that sends audio signals.

The user can place a plastic bag in the inner casing 10-3 to contain the waste. A size of most plastic bags are larger than that of the inner casing 10-3, and the edge of an opening of the plastic bag can be folded backward between the inner casing 10-3 and the outer casing 10-2.

Figure 5:
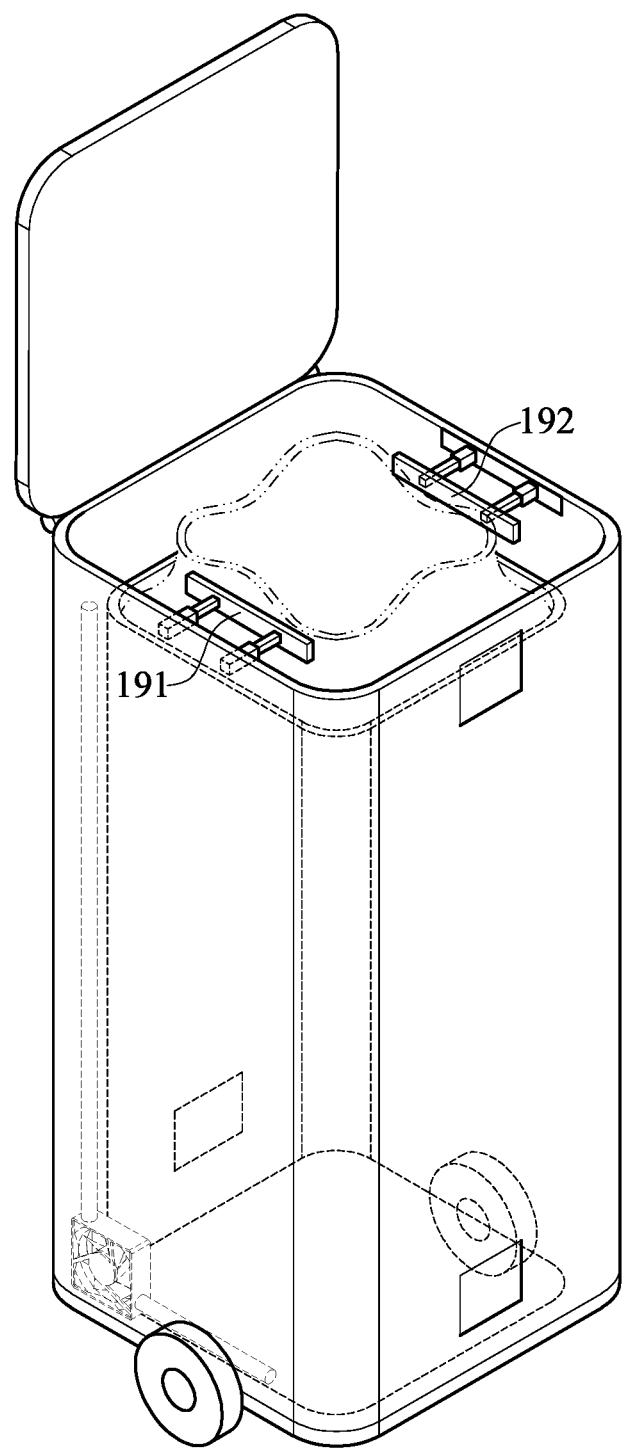
FIG. 5 is a schematic view of a sealing module of the waste storage device in one embodiment of the present disclosure.

Reference is made to FIG. 5, which is a schematic view of a sealing module of the waste storage device in one embodiment of the present disclosure. An activation of the sealing module 18 can be triggered according to the weight value of the inner casing 10-3 detected by the weight sensor 177 of the sensor module 17, triggered by a physical button, or triggered by using an application (APP) in the mobile device to be communicatively connected with the communication module 20 of the waste storage device 1 so as to send an opening sealing signal.

In this embodiment, the communication module 20 includes a wired communication unit (not shown in the figures) and a wireless communication unit (not shown in the figures). The wired communication unit (not shown in the figures) can work in cooperation with the power module 13, and be communicatively connected with the power module 13 through power wires. The wired communication unit (not shown in the figures) can also be arranged independently to be communicatively connected with the intelligent management system SYS1, and receive the control signal of the intelligent management system SYS1 or data in a database.

The wireless communication unit (not shown in the figures) can be a WI-FI® communication unit, a BLUETOOTH® communication unit, a ZIGBEE® communication unit, a LoRa communication unit, a Sigfox communication unit, or an NB-IoT communication unit.

Referring to FIG. 5, when the weight value of the inner casing 10-3 is greater than the predetermined weight value, the control module 11 sends the opening sealing signal to the exhaust fan 181, and then the exhaust fan 181 extracts air from the outside through the second opening 181B and blows the air towards the first opening 181A. That is to say, the control module 11 can control the exhaust fan 181 to perform a reversed operation, and transmit air from the bottom side of the outer casing 10-2 to the top side of the outer casing 10-2, thereby blowing upward an edge of the opening of the plastic bag.

In this embodiment, the optical sensor 175 is disposed on the top side of the outer casing 10-2 to detect whether or not the edge of the opening of the plastic bag exceeds the top edge of the outer casing 10-2. When the optical sensor 175 disposed on the top side of the outer casing 10-2 detects that the edge of the opening of the plastic bag exceeds the top edge of the outer casing 10-2, the control module 11 sends the opening sealing signal to a sealing processing unit (not shown in the figures) of the sealing module 19, the sealing processing unit (not shown in the figures) drives a first sealing unit 191 and a second sealing unit 192 of the sealing module 19 to approach each other until the first sealing unit 191 and the second sealing unit 191 are contacted to each other. The first sealing unit 191 and the second sealing unit 192 are electrically connected to the power module 13. After the sealing processing unit (not shown in the figures) receives the opening sealing signal, the sealing processing unit (not shown in the figures) charges and heats the first sealing unit 191 and the second sealing unit 192. When the first sealing unit 191 and the second sealing unit 192 approaches and are adjacent to each other, the plastic bag is then sandwiched between the first sealing unit 191 and the second sealing unit 192, such that the first sealing unit 191 and the second sealing unit 192 fuses together the edge of the opening of the plastic bag, thereby sealing the opening of the plastic bag.

Figure 6:
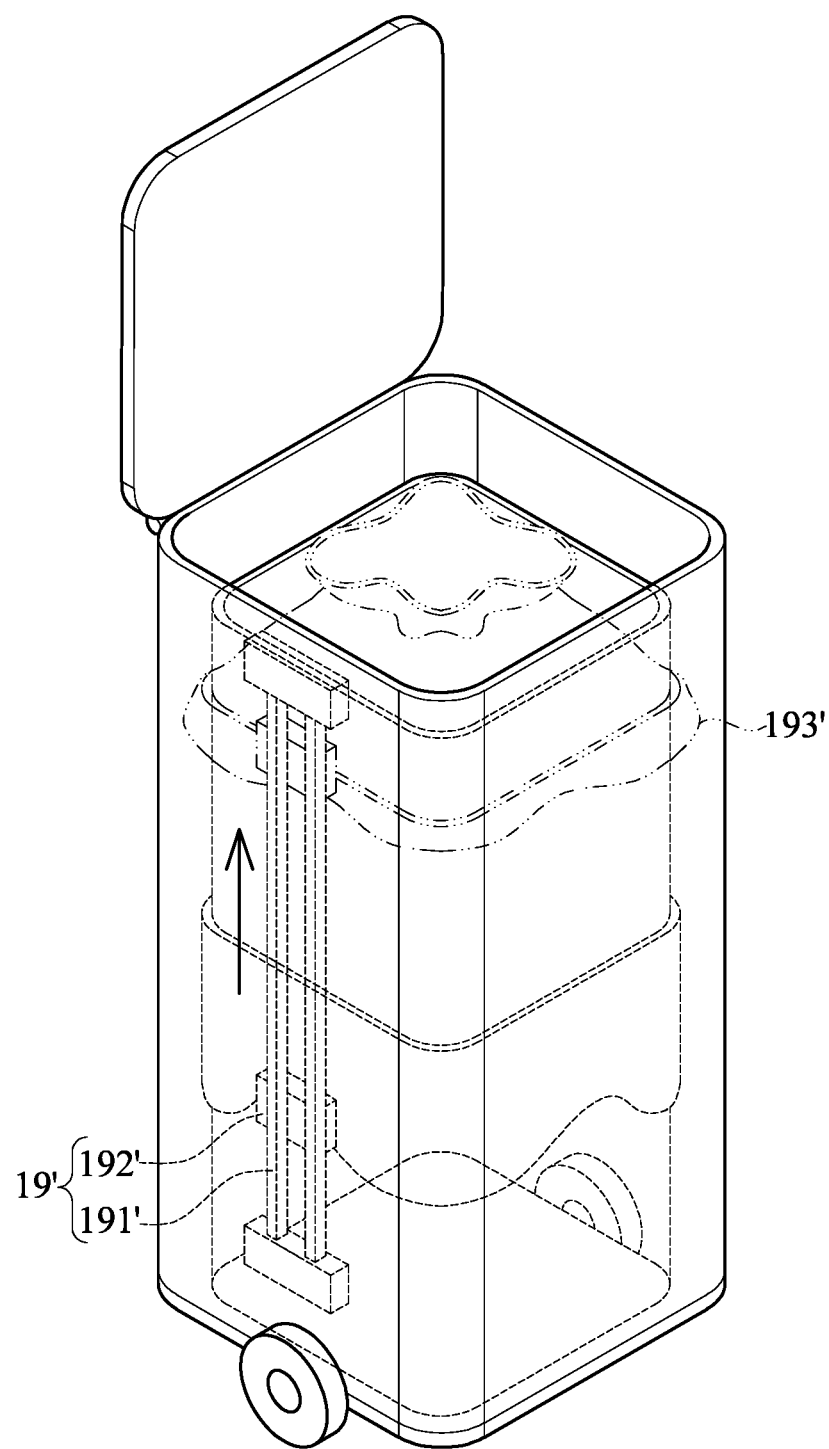
FIG. 6 is another schematic view of the sealing module of the waste storage device in one embodiment of the present disclosure.

Reference is made to FIG. 6, which is another schematic view of the sealing module of the waste storage device in one embodiment of the present disclosure. In this embodiment, another sealing module 19' is provided.

The sealing module 19' includes two supporting rods 191', and a sealing unit 192' is movably disposed on the two supporting rods 191'. That is to say, the two supporting rods 191' can be slide rails. The sealing unit 192' includes a micromotor (not shown in the figures), a heat melting unit (not shown in the figures), and a cutting unit (not shown in the figures). The micromotor (not shown in the figures) is provided for assisting the sealing unit 192' to move up and down on the two supporting rods 191'. The sealing unit 192' has two small holes formed thereon for a plastic cord 193' to pass through, and a storage tray for the plastic cord 193' is provided on the bottom side of the outer casing 10-2. Initially, the plastic cord 193' extends to form a loop after passing through the sealing unit 192', the loop having a size that is sufficient for surrounding the inner casing 10-2.

When the optical sensor 175 arranged on the top side of the outer casing 10-2 detects that the edge of the opening of the plastic bag exceeds the top edge of the outer casing 10-2, the control module 11 sends the opening sealing signal to the sealing module 19'. The micromotor (not shown in the figures) of the sealing module 19' then drives the sealing unit 192' and the plastic cord 193' of the shape of a ring to move upwards until the plastic cord 193' exceeds the top edge of the inner casing 10-3. At this time, the sealing module 19' tightens the plastic cord 193' to tie up the plastic bag. When the plastic cord 193' is tightened, the heat melting unit (not shown in the figures) of the sealing unit 192' heats up and melts the plastic cord 193', and then the cutting unit is used to cut the melted plastic cord 193', thereby sealing the opening of the plastic bag.

In this embodiment, the power module 13 is disposed in the casing 10 and is electrically connected to the control module 11. The power module 13 includes a battery unit 131 and a charging unit 132. The battery unit 131 provides a driving power to the control module 11, the microphone module 12, the power module 13, the map analysis module 14, the storage module 15, the moving module 16, the sensor module 17, the deodorization module 18, the sealing module 19, and the communication module 20. The charging unit 132 is electrically connected to the battery unit 131.

When the battery unit 131 has a power value lower than a predetermined power value, the control module 11 provides a low power driving signal and a charging route to the moving module 16 according to the map data, such that the waste storage device 1 can seek out a charging base according to the charging route and perform charging.

The battery unit 131 is a lithium ion battery, a lithium manganese battery, a nickel hydrogen battery, or a lithium ion polymer battery. The charging unit 132 is a wired charging unit or a wireless charging unit. The charging base is a wired power base or a wireless power base. When the charging unit 132 is a wired charging unit, the charging unit 132 may be an alternating current to direct current (AC-DC) voltage converter or a DC-DC voltage converter. When the charging unit 132 is a wireless charging unit, the charging unit 132 includes a wireless charging coil. In addition, the charging unit 132 may include a wired charging unit and a wireless charging unit simultaneously, and adjust and switch the corresponding charging unit according to a detected type of the charging base.

Figure 8:
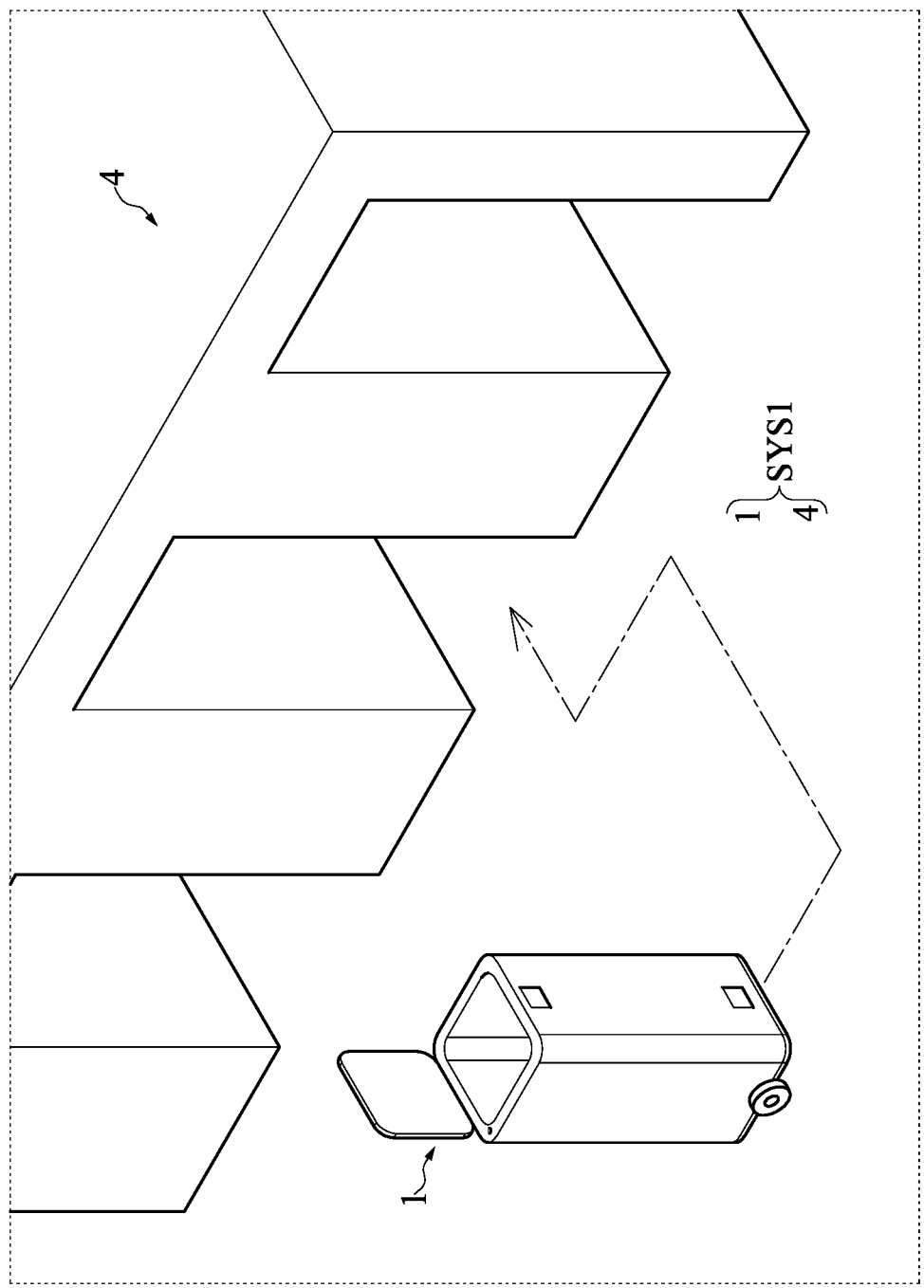
FIG. 8 is a schematic view showing the waste storage device periodically returning to a preset position in one embodiment of the present disclosure.

References are made to FIG. 1 and FIG. 8. FIG. 8 is a schematic view showing the waste storage device periodically returning to a preset position in one embodiment of the present disclosure.

In this embodiment, the waste storage device 1 can be communicatively connected with a mobile device 9 or the server 2 through the communication module 20. That is to say, the user can directly send the coordinates of the target position L1 to the waste storage device 1 through the mobile device 9 and request the waste storage device 1 to move to the target position L1. On the other hand, the user can also send the coordinates of the target position L1 to the server 2 through the mobile device 9, and the server 2 sends the moving signal to the waste storage device 1, such that the waste storage device 1 is moved to the target position L1. In addition, the server 2 can also provide the map data to the waste storage device 1. Furthermore, the server 2 can provide more complex voice recognition functions and map analysis functions. When the predetermined area is relatively complex and large, a function of route analysis can be performed by the server 2.

As shown FIG. 8, the intelligent management system SYS1 can pair the waste storage device 1 to a waste treatment device 4. The waste storage device 1 periodically returns to a fixed position for charging and disposing of the waste or performing waste classification.

Beneficial Effects of Embodiments

One of the beneficial effects of the waste storage device 1 and the intelligent management system SYS1 of the present disclosure is that, the waste storage device 1 and the intelligent management system SYS1 can move to a target position L1 according to the first audio signal, making it more convenient to use and effectively improving the user experience.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A waste storage device, comprising:
a casing, wherein the casing includes a cover, an inner casing and an outer casing, the inner casing is disposed inside the outer casing, and the cover is disposed on the outer casing;
a control module disposed in the casing;
a microphone module disposed on an outer surface of the casing, the microphone module being electrically connected to the control module; and
a moving module electrically connected to the control module;
wherein, when the microphone module receives a first audio signal, the microphone module transmits the first audio signal to the control module, the control module analyzes an audio sending direction of the first audio signal, and the control module provides a driving signal to the moving module according to the first audio signal, so as to drive the waste storage device to move in the audio sending direction;
wherein the waste storage device further includes:
an exhaust fan; and
a sealing module including a first sealing unit and a second sealing unit;
wherein the control module controls the exhaust fan, in response to detecting that a weight value of the inner casing is greater than a predetermined weight value, to pump air outside the waste storage device into a space between the inner casing and the outer casing, thereby blowing upward an edge of an opening of a plastic bag disposed in the inner casing;
wherein the control module further controls the sealing module, in response to detecting that the edge of the opening of the plastic bag exceeds a top edge of the outer casing, to drive the first sealing unit and the second sealing unit to approach each other until the first sealing unit and the second sealing unit are in contact with each other, so as to seal the plastic bag.

2. The waste storage device according to claim 1, further comprising:
a map analysis module electrically connected to the control module, the map analysis module providing a route according to a map data and the audio sending direction; and
a sensor module electrically connected to the control module;
wherein the control module provides the driving signal to the moving module according to a moving signal provided by the sensor module, the audio sending direction, and the route, such that the waste storage device moves in the audio sending direction.

3. The waste storage device according to claim 2, wherein the waste storage device further comprises a storage module, and the map data is stored in the storage module.

4. The waste storage device according to claim 2, wherein the control module further analyzes the first audio signal to obtain a target position, when the control module moves in the audio sending direction and the waste storage device is adjacent to the target position, the control module sends a stop signal to the moving module, such that the waste storage device stops at a position with a predetermined distance from the target position.

5. The waste storage device according to claim 2, wherein the sensor module includes a gyroscope sensor, a geomagnetic sensor, an optical sensor, an infrared sensor, a laser ranging sensor, an olfactory gas sensor, a weight sensor, and an image capture sensor, and the infrared sensor or the laser ranging sensor provides the moving signal to the control module.

6. The waste storage device according to claim 5, wherein the infrared sensor or the laser ranging sensor of the sensor module is disposed on the outer casing.

7. The waste storage device according to claim 5, wherein the waste storage device further comprises a deodorization module disposed between the inner casing and the outer casing, the deodorization module includes the exhaust fan and an odor processing unit, the exhaust fan includes a first opening and a second opening, the first opening is connected to the odor processing unit, and the exhaust fan extracts air inside the casing; wherein the air is then processed by the odor processing unit before being discharged from the waste storage device.

8. The waste storage device according to claim 7, wherein whether or not the deodorization module is turned on is determined by whether or not the olfactory gas sensor of the sensor module detects a predetermined gas, and when a predetermined gas is detected by the olfactory gas sensor, the deodorization module is turned on; wherein the olfactory gas sensor is disposed on an inner side of the outer casing.

9. The waste storage device according to claim 7, wherein the weight sensor of the sensor module is disposed on a bottom side of the outer casing, and when the inner casing is disposed in the outer casing, the inner casing is disposed on one side of the weight sensor; wherein the weight sensor is used to detect a weight value of the inner casing, and when the weight value of the inner casing is greater than a predetermined weight value, the control module provides a notification signal.

10. The waste storage device according to claim 9, wherein the notification signal is an optical signal or an audio signal.

11. The waste storage device according to claim 1, wherein the moving module includes a motor and a moving unit, the motor is connected to the moving unit, and the motor receives the driving signal to drive the moving unit.

12. The waste storage device according to claim 1, further comprising:
a power module disposed in the casing and electrically connected to the control module, the power module including:
a battery unit providing a driving electricity to the control module; and
a charging unit electrically connected to the battery unit;
wherein, when the battery unit has a power value that is lower than a predetermined power value, the control module provide a low battery driving signal to the moving module according to the map data, such that the waste storage device seeks out a charging base and is charged.

13. The waste storage device according to claim 12, wherein the charging unit is a wired charging unit or a wireless charging unit, and the charging base is a wired charging base or a wireless charging base.

14. The waste storage device according to claim 1, wherein the waste storage device further comprises a communication module that is communicatively connected to a mobile device or a server.

15. The waste storage device according to claim 14, wherein the communication module is a WI-FI® communication unit, a BLUETOOTH® communication unit, a ZIGBEE® communication unit, a LoRa communication unit, a Sigfox communication unit, or an NB-IoT communication unit.

16. An intelligent management system disposed at a predetermined area, the intelligent system comprising:
a server; and
a waste storage device communicatively connected to the server, the waste storage device including:
a casing, wherein the casing includes a cover, an inner casing and an outer casing, the inner casing is disposed inside the outer casing, and the cover is disposed on the outer casing;
a control module disposed in the casing;
a microphone module disposed on an outer surface of the casing, the microphone module being electrically connected to the control module;
a communication module electrically connected to the control module, the communication module of the waste storage device being communicatively connected to the server, and the server providing a map data to the waste storage device; and
a moving module electrically connected to the control module;
wherein, when the microphone module receives a first audio signal, the microphone module transmits the first audio signal to the control module, the control module analyzes an audio sending direction of the first audio signal, and the control module provides a driving signal to the moving module according to the first audio signal and the map data to the moving module, so as to drive the waste storage device to move in the audio sending directions;
wherein the waste storage device further includes:
an exhaust fan; and
a sealing module including a first sealing unit and a second sealing unit;
wherein the control module controls the exhaust fan, in response to detecting that a weight value of the inner casing is greater than a predetermined weight value, to pump air outside the waste storage device into a space between the inner casing and the outer casing, thereby blowing upward an edge of an opening of a plastic bag disposed in the inner casing;
wherein the control module further controls the sealing module, in response to detecting that the edge of the opening of the plastic bag exceeds a top edge of the outer casing, to drive the first sealing unit and the second sealing unit to approach each other until the first sealing unit and the second sealing unit are in contact with each other, so as to seal the plastic bag.

17. The intelligent management system according to claim 16, wherein the server is a local server that is disposed within the predetermined area.

* * * * *